United States Patent Office 2,793,222
Patented May 21, 1957

2,793,222

1,2-BIS-HEPTAMETHYLCYCLOTETRASILOXANYL-ETHANE AND POLYMERIC DERIVATIVES THEREOF

Simon W. Kantor and Robert C. Osthoff, Schenectady, N. Y., assignors to General Electric Company, a corporation of New York No Drawing. Application May 11, 1954,
Serial No. 429,131

3 Claims. (Cl. 260—448.2)

This invention relates to new organopolysiloxane compositions and methods of preparing these compositions. Particularly, this invention is concerned with a new composition of matter, 1,2-bis-heptamethylcyclotetrasiloxanyl-ethane having the structural formula

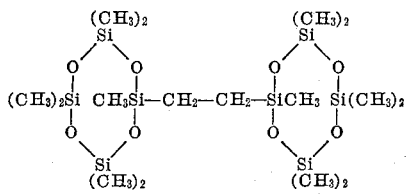

and its preparation. This invention is also concerned with polymeric organopolysiloxanes which are copolymers of the aforementioned compound and octamethylcyclotetrasiloxane and the method of preparing these polymeric compounds.

1,2-bis-heptamethylcyclotetrasiloxanyl-ethane may be described as a dimeric form of octamethylcyclotetrasiloxane and may be prepared in a number of ways. For example, octamethylcyclotetrasiloxane may be chlorinated by known methods to form chloromethylheptamethylcyclotetrasiloxane. This chlorinated compound may then be dissolved in ether and added to a solution of sodium in liquid ammonia to form the dimeric compound by the Wurtz reaction. The dimeric compound may also be formed by forming the Grignard reagent of chloromethylheptamethylcyclotetrasiloxane and adding cobaltous bromide, cobaltous chloride or silver bromide to form the dimeric product. Even though the two methods of preparation described above are satisfactory, we prefer to prepare the dimeric product by contacting octamethylcyclotetra siloxane with acyl peroxides such as benzoyl peroxide. We prefer this latter method because of the speed of reaction, the relatively high yields obtainable, and the availability of the starting materials.

The reaction using an acyl peroxide and octamethylcyclotetrasiloxane may be effected by merely heating a mixture of the two reactants or adding the peroxide to the hot octamethylcyclotetrasiloxane. The ratio of peroxide to organopolysiloxane may vary within wide limits, for example, from about 0.2 to 20 percent peroxide, based on the weight of the octamethylcyclotetrasiloxane. Preferably, we use from about 0.4 to 10 percent, by weight, of the peroxide. The temperature of the reaction may also vary within wide limits. Since the rate of reaction depends in part on the rate of decomposition of the peroxide, it is desirable to maintain the temperature at such a point that decomposed peroxide is available to sustain the reaction. In practice, we have found that temperatures of from about 75 to 150° C., and preferably about 120° C. are suitable for the reaction. Preferably, the reaction mixture is agitated during the course of reaction to maintain the rate of reaction at a high level. In practice, it has been found that the reaction is completed within about one hour when stirring and a temperature of about 120° C. are used. The 1,2-bis-heptamethylcyclotetrasiloxanyl-ethane may be isolated by distillation. In addition to benzoyl peroxide, other acyl peroxides may be used, including caprylyl peroxide, tertiary-butyl perbenzoate, etc.

1,2-bis-heptamethylcyclotetrasiloxanyl-ethane is valuable per se as a high temperature lubricant, as a lubricant additive, and as hydraulic fluid for use at elevated temperatures. In addition, the compound is valuable as an intermediate in the preparation of organopolysiloxane elastomers which may be used as potting gels for electrical insulation.

By the method of the present invention organopolysiloxane elastomers may be prepared directly from relatively low molecular organopolysiloxanes without the necessity of first forming a gum. In the preparation of organopolysiloxane elastomers it has been customary to form relatively long chain organopolysiloxanes and then add a cross linking agent which has the effect of joining these long chains to form an elastomeric product. A disadvantage of this method of preparing elastomers is the fact that the final elastomer has the cross linking agent incorporated therein. Since some of these cross linking agents or their decomposition products are reactive with organopolysiloxanes there is a tendency for rearrangement of the elastomers to take place at elevated temperatures. This rearrangement can cause degradation of the polymer which impairs its physical properties.

By the method of the present invention we are able to form elastomers of organopolysixolanes which contain no non-silicone cross linking agents. These elastomers are prepared by incorporating in a polymerizable organopolysiloxane mixture some of the 1,2-bis-heptamethylcyclotetrasiloxanyl-ethane of the present invention, hereinafter referred to as "ditetramer." Since ditetramer is actually two octamethylcyclotetrasiloxane, (hereinafter referred to as "tetramer"), molecules connected by an ethylene bridge, the ditetramer is able to supply cross links (ethylene bridges) to the organopolysiloxane during polymerization rather than forming the cross links after polymerization is completed. By mixing ditetramer with tetramer, the number of cross links per elastomer molecule may be controlled.

In polymerizing a mixture of ditetramer and tetramer, the mixture is subjected to the action of a rearrangement catalyst which ruptures silicon-oxygen bonds of the cyclic compounds and allows combination of the ruptured bonds of one molecule with the ruptured bonds of another molecule to form high molecular weight linear or high molecular weight cyclic compounds joined by the ethylene bridges present in the ditetramer. Among the rearrangement catalysts which may be used for the polymerization of the organopolysiloxane mixture of the present invention may be mentioned the conventional catalysts such as ferric chloride, sulfuric acid, cesium hydroxide, rubidium hydroxide, sodium hydroxide, and potassium hydroxide, as well as those transient basic catalysts which may be decomposed by heat after the polymerization has taken place. This latter group of catalysts, which may be decomposed by heat, include the quaternary phosphonium hydroxides, and the quaternary ammonium hydroxides, for example, tetramethyl phosphonium hydroxide, tertan-butyl phosphonium hydroxide, tetramethyl ammonium hydroxide, etc.

In preparing the elastomers of the present invention the ratio of ditetramer to tetramer may vary within wide limits, for example, from about 0.1 percent to about 75 percent by weight of ditetramer per hundred percent of total organopolysiloxanes present. Preferably, we employ from about 0.1 to 10 percent ditetramer, by weight. We have found that the hardness of the elastomer formed varies with the percentage of ditetramer present. For example, when about 0.2 percent ditetramer is included in the organopolysiloxane mixture a very flexible elastomer is obtained. As the percentage of ditetramer increases the product becomes harder and harder until at about 75 percent ditetramer, a brittle product is obtained. The concentration of rearrangement (polymerization) catalyst used in the practice of the present invention may also vary within wide limits, for example, from about 0.001 percent to 5 percent, by weight, of the organopolysiloxanes used. Preferably, the catalyst used is of the transient type disclosed above which is decomposable after the elastomer is formed. By using these catalysts it is possible to form the elastomer by heating the mixture of organo polysiloxanes and catalyst at a temperature below the decomposition temperature of the catalyst. After the elastomer is formed, it is heated to a temperature above the decomposition temperature of the catalyst to decompose the catalyst. It is desirable to decompose the catalyst to prevent any degradation of the elastomer by operation at high temperature. In practice, the polymerization may be carried out at temperatures from about room temperature up to 130° C. The elastomer is then heated at a temperature of about 150 to 250° C. to decompose the catalyst.

Elastomers formed in this manner have been found to have unusual heat stability when maintained at temperatures as high as 250° C. in an air oven. Samples of elastomers prepared by our method using tetramethyl ammonium hydroxide as a catalyst have been found to lose only from 12 to 14 percent of their weight after being maintained at 200° C. in an air oven for over 200 hours. This 12 to 14 percent weight loss represents evaporation of volatile materials in the product rather than decomposition of the product. Although the method of forming elastomers of the present invention has been outlined only with respect to compositions containing ditetramer and tetramer, it should be understood that other cyclic organopolysiloxanes such as, for example, hexamethylcyclotrisiloxane, decamthylcyclopentasiloxane, etc., may be used in place of the tetramer.

Since the gums of the present invention may be formed in situ they are valuable as potting gels for use as insulation in electrical apparatus.

The following examples are illustrative of the practice of our invention and are not intended for purposes of limitation.

*Example 1*

1,2-bis-heptamethylcyclotetrasiloxanyl-ethane was prepared by adding 25 grams of benzoyl peroxide to 500 grams of octamethylcyclotetrasiloxane which was maintained at a temperature of about 120° C. The rate of addition was regulated so that the 25 grams had been added over a period of 45 minutes. The reaction mixture was then stirred an additional hour to insure complete reaction. The reaction mixture was then washed with water and fractionally distilled to yield 1,2-bis-heptamethylcyclotetrasiloxanyl-ethane which boiled at 145 to 147° C. at 2 mm. and had a melting point of 56 to 56.5° C.

*Example 2*

Over a period of about 40 minutes 84.2 grams of chloromethylheptamethylcyclotetrasiloxane was added to a solution of 11.5 grams of sodium in 800 ml. of liquid ammonia which was continuously agitated. 25 grams of solid ammonium chloride was then added to decompose the reaction mixture. About 25 ml. of water was then added and the ammonia was allowed to evaporate. Finally 100 ml. of ether and 400 ml. of water were added and the mixture was stirred and allowed to separate into two layers. The ether layer was separated off and after being dried was fractionally distilled to yield 1,2-bis-heptamethylcyclotetrasiloxanylethane which had a melting point of 56 to 56.5° C. Analysis of this material showed it to contain 32.6 percent carbon and 7.9 percent hydrogen (theoretical: 32.50 percent carbon, 7.84 percent hydrogen). The product prepared in this example was mixed with the product prepared in Example 1 and the melting point was determined. This melting point remained at 56 to 56.5° C. indicating that the products prepared by the methods of the two examples were identical.

*Example 3*

An elastomer was prepared by mixing 2 grams of 1,2-bis-heptamethylcyclotetrasiloxanyl-ethane, 98 grams of octamethylcyclotetrasiloxane and 0.02 gram of solid tetramethyl ammonium hydroxide and heating the mixture to 100° C. After 16 hours a firm gel had been formed which showed no shrinkage and contained no gas bubbles. This gel was placed in an air oven and maintained at 200° C. for 210 hours, during which time the weight of the sample decreased 13.3 percent.

*Example 4*

A gel was prepared by the method of Example 3 using 5 grams of 1,2-bis-heptamethylcyclotetrasiloxanyl-ethane, 95 grams of octamethylcyclotetrasiloxane, and 0.02 gram of solid tetramethyl ammonium hydroxide. This gel was stiffer than the gel formed in Example 3 and had a weight loss of 14.9 percent under the conditions of Example 3.

*Example 5*

A gel was prepared by the method of Example 3 using 10 grams of 1,2-bis-heptamethylcyclotetrasiloxanylethane, 90 grams of octamethylcyclotetrasiloxane, and 0.02 gram of solid tetramethyl ammonium hydroxide. This gel was stiffer than those formed in the preceding examples and had a weight loss of 16.7 percent upon heating at 200° C. in an air oven for 210 hours.

*Example 6*

A gel was prepared by the method of Example 3 using 0.4 gram of 1,2-bis-heptamethylcyclotetrasiloxanyl-ethane, 100 grams of octamethylcyclotetrasiloxane, and 0.02 gram of tetra-n-butyl phosphonium hydroxide. The tetra-n-butyl phosphonium hydroxide was added as a 4 percent organopolysiloxane solution prepared in accordance with the method described in the copending application of Simon W. Kantor and Alfred R. Gilbert, Serial No. 429,134, now abandoned, (D–15D–96) filed concurrently herewith and assigned to the same assignee as the present invention. The product of this reaction was a clear, stiff gel which did not decompose when maintained for extended periods of time in a 200° C. air oven.

*Example 7*

A gel was prepared by the method of Example 3 using 0.2 gram of 1,2-bis-heptamethylcyclotetrasiloxanylethane, 100 grams of octamethylcyclotetrasiloxane, and 0.02 gram of tetra-n-butyl phosphonium hydroxide. The tetra-n-butyl phosphonium hydroxide was added as a 4 percent organopolysiloxane solution prepared in accordance with the method described in the aforementioned copending Kantor and Gilbert application. The product of this reaction was a clear, stiff gel which did not decompose when maintained for extended periods of time in a 200° C. air oven.

What we claim as new and desire to secure by Letters Patent of the United States is:

1. A process of preparing 1,2-bis-heptamethylcyclotetrasiloxanyl-ethane which process comprises reacting chloromethylheptamethylcyclotetrasiloxane with a member selected from the group consisting of (*a*) sodium in liquid ammonia and (*b*) magnesium, and subsequently decomposing the Grignard formed in (*b*) to form 1,2-bis-heptamethylcyclotetrasiloxanyl-ethane.

2. A process of preparing 1,2-bis-heptamethylcyclotetrasiloxanyl-ethane which comprises reacting chloromethylheptamethylcyclotetrasiloxane with sodium in liquid ammonia.

3. A process of preparing 1,2-bis-heptamethylcyclo-tetrasiloxanyl-ethane which comprises forming the Grignard reagent of chloromethylheptamethylcyclotetrasiloxane and thereafter decomposing said Grignard by adding thereto a member selected from the group consisting of cobaltous bromide, cobaltous chloride, and silver bromide.

References Cited in the file of this patent

UNITED STATES PATENTS

| | | |
|---|---|---|
| 2,443,353 | Hyde et al. | June 15, 1948 |
| 2,518,160 | Mathes | Aug. 8, 1950 |
| 2,753,365 | Kantor et al. | July 3, 1956 |
| 2,762,827 | Johannson | Sept. 11, 1956 |